(12) United States Patent
Mulik et al.

(10) Patent No.: US 10,399,055 B2
(45) Date of Patent: *Sep. 3, 2019

(54) METHODS FOR PRODUCING PRECURSOR SOLUTIONS AND SOL-GELS FOR NANO-ENGINEERED CARBON MATERIALS AND NANO-ENGINEERED CARBON MATERIALS CREATED THEREFROM

(71) Applicant: Georgia-Pacific Chemicals LLC, Atlanta, GA (US)

(72) Inventors: Sudhir M. Mulik, North Wales, PA (US); Joseph F. Ludvik, Midlothian, VA (US); Robert W. Fleming, Alpharetta, GA (US); Christopher M. Lee, Norcross, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/959,433

(22) Filed: Apr. 23, 2018

(65) Prior Publication Data

US 2018/0236424 A1 Aug. 23, 2018

Related U.S. Application Data

(63) Continuation of application No. 14/679,400, filed on Apr. 6, 2015, now Pat. No. 9,968,900, which is a
(Continued)

(51) Int. Cl.
*B01J 13/00* (2006.01)
*C01B 32/00* (2017.01)
*C01B 32/05* (2017.01)

(52) U.S. Cl.
CPC .......... *B01J 13/0091* (2013.01); *C01B 32/00* (2017.08); *C01B 32/05* (2017.08)

(58) Field of Classification Search
CPC ....... B01J 13/0091; C01B 32/00; C01B 32/05
(Continued)

(56) References Cited

U.S. PATENT DOCUMENTS

| 3,644,256 A | 2/1972 | Broisman |
| 4,061,620 A | 12/1977 | Gillern |

(Continued)

FOREIGN PATENT DOCUMENTS

CN 20110031652 5/2013

OTHER PUBLICATIONS

International Search Report and Written Opinion of International Patent Application PCT/US2011/039802, dated Feb. 21, 2012.

*Primary Examiner* — Harold Y Pyon
*Assistant Examiner* — Danny N Kang
(74) *Attorney, Agent, or Firm* — Edmonds & Cmaidalka, P.C.; Jared E. Cmaidalka; Ram W. Sabnis

(57) ABSTRACT

Methods of manufacturing nano-engineered carbon materials, such as carbon aerogels and carbon xerogels, and methods of manufacturing precursor solutions and sol-gels for making the same are provided. A method for manufacturing a precursor solution comprises programmed-addition of a cross-linking agent to a component mixture comprising a resorcinol compound. A method for manufacturing a sol-gel comprises subjecting a precursor solutions to at least one heat treatment. Methods for producing nano-engineered carbon materials from precursor solutions and sol-gels are also provided. Methods for using the nano-engineered carbon materials are also disclosed. The resulting nano-engineered carbon materials can be useful in a range of products including, supercapacitor applications, high-surface-area electrodes, fuel cells, and desalination systems.

20 Claims, 3 Drawing Sheets

Related U.S. Application Data continuation of application No. 13/157,029, filed on Jun. 9, 2011, now Pat. No. 8,999,202.

(60) Provisional application No. 61/352,965, filed on Jun. 9, 2010.

(58) Field of Classification Search
USPC .......................................................... 252/500
See application file for complete search history.

(56) References Cited

U.S. PATENT DOCUMENTS

| | | |
|---|---|---|
| 4,197,219 A | 4/1980 | Damico |
| 4,373,062 A * | 2/1983 | Brown .................... C08G 8/24 |
| | | 524/596 |
| 5,178,986 A * | 1/1993 | Zampini ................ G03F 7/022 |
| | | 430/165 |
| 5,945,084 A | 8/1999 | Droege |
| 7,074,880 B2 | 7/2006 | Rhine et al. |
| 7,700,687 B2 | 4/2010 | Durairaj et al. |
| 8,304,465 B2 | 11/2012 | Coronado et al. |
| 2002/0009585 A1 | 1/2002 | Albert et al. |
| 2006/0090436 A1 | 5/2006 | Dupre, Jr. et al. |
| 2007/0152363 A1 | 7/2007 | Begag et al. |
| 2007/0167534 A1* | 7/2007 | Coronado ................ C08J 9/28 |
| | | 521/64 |
| 2008/0112876 A1 | 5/2008 | Dailey |
| 2009/0283480 A1 | 11/2009 | Schadler et al. |

* cited by examiner

METHODS FOR PRODUCING PRECURSOR SOLUTIONS AND SOL-GELS FOR NANO-ENGINEERED CARBON MATERIALS AND NANO-ENGINEERED CARBON MATERIALS CREATED THEREFROM

CROSS-REFERENCE TO RELATED APPLICATION

This application is a continuation of co-pending U.S. patent application Ser. No. 14/679,400, filed on Apr. 6, 2015, which is a continuation of U.S. patent application Ser. No. 13/157,029, filed on Jun. 9, 2011, now U.S. Pat. No. 8,999,202, which claims priority to U.S. Provisional Patent Application No. 61/352,965, filed on Jun. 9, 2010, which are all incorporated by reference herein.

FIELD OF THE INVENTION

This application and the disclosures herein generally discuss and relate to methods for manufacturing of nano-engineered carbon materials, for example, carbon aerogels and carbon xerogel s.

BACKGROUND OF THE INVENTION

For many years, nano-engineered carbon materials such as carbon aerogels and carbon xerogels have been used in a variety of products to improve properties including, but not limited to, electrical conductivity and energy storage in, for instance, supercapacitor applications. Certain qualities of nano-engineered carbon materials (e.g., carbon aerogels, carbon xerogels, carbon foams, carbon filter paper)—such as, for example, electrical conductivity, low density, high surface area, controllable pore size, and high purity—are desirable in many applications, and thus nano-engineered carbon materials possessing those qualities generally have high commercial value in the marketplace.

Methods for synthesizing nano-engineered carbon materials such as carbon aerogels and carbon xerogels on the laboratory scale are known in the art. Those methods may involve, for example, using resorcinol and formaldehyde for producing precursor solutions (e.g., a "sol," which is a solution or a colloidal dispersion of particles in a liquid) for further processing into a sol-gel (e.g., a network in a continuous liquid phase or a colloidal suspension of particles that is gelled to form a solid) used for manufacturing nano-engineered carbon materials. However, the amount of chemical energy released from mixing the resorcinol (and all of its derivatives) with formaldehyde in the presence of a catalyst and heat to create the precursor solution has heretofore precluded large-scale manufacturing of nano-engineered carbon materials such as carbon aerogels and xerogels. Uncontrolled chemical reactions with stored energy release capabilities may represent an increased industrial explosion hazard, endangering employees and the environment, and raising the cost of manufacturing polymers.

Accordingly, there is a need for a method to sufficiently control the release of chemical energy (measured, for instance, in exotherms) in the manufacturing of precursor solutions and sol-gels such that large-scale production of nano-engineered carbon materials is possible. The improved efficiency in manufacturing and increased safety (for example, by lowering the risk of container rupture or explosion) that can be achieved by controlling the release of chemical energy would be improved compared to conventional methods used to create nano-engineered carbon materials that are currently on the market.

SUMMARY OF THE INVENTION

Figure 1:
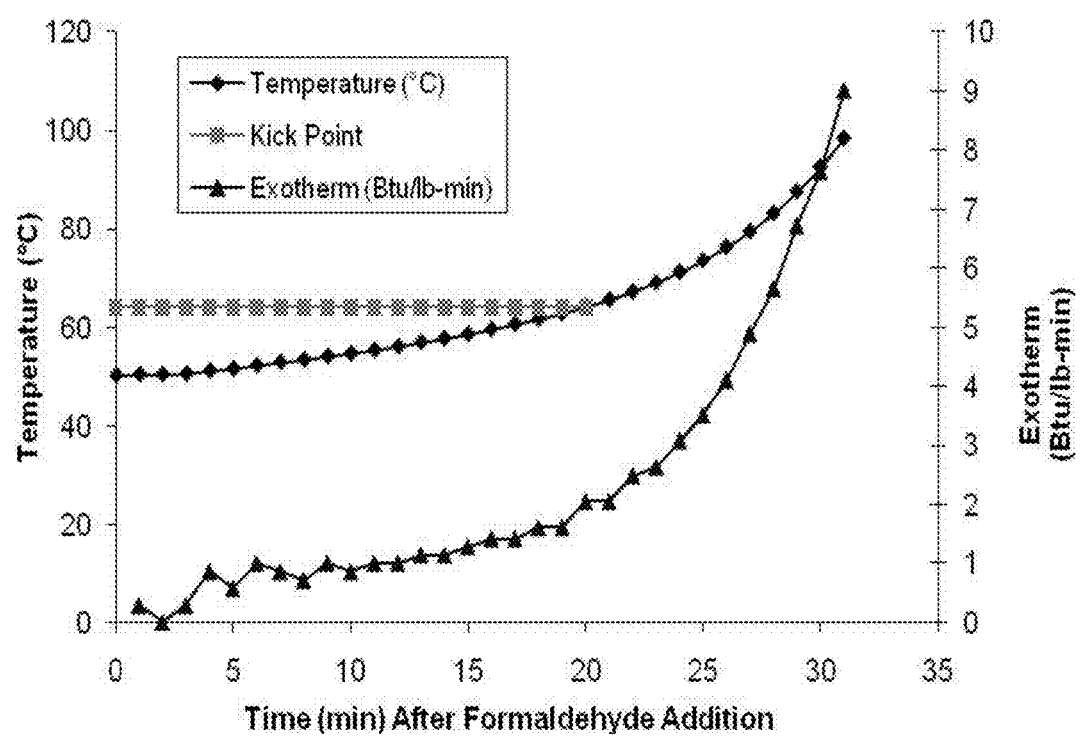
FIG. 1 is a graph demonstrating the exotherm (BTU/lb-min) of a reaction between resorcinol and formaldehyde in the presence of a catalyst under adiabatic conditions.

This application and the disclosures described herein generally relate to methods of manufacturing nano-engineered carbon materials, such as carbon aerogels and carbon xerogels, and methods of manufacturing precursor solutions and sol-gels for making the same. In one embodiment, a method for safely manufacturing a precursor solution on a large scale, approximately 10,000 lbs for example, comprises programmed-addition of a cross-linking agent to a component mixture comprising a resorcinol compound. In another embodiment, a method for manufacturing a sol-gel comprises subjecting the precursor solutions taught herein to at least one heat treatment. Also disclosed generally herein are methods for producing nano-engineered carbon materials from the precursor solutions and sol-gels taught herein. Methods for using the nano-engineered carbon materials are also disclosed. The resulting nano-engineered carbon materials of the present disclosure can be useful in a range of products including, but not limited to, supercapacitor applications, high-surface-area electrodes, fuel cells, and desalination systems.

DETAILED DESCRIPTION OF THE INVENTION

Methods for Making a Precursor Solution for a Nano-Engineered Carbon Material

Disclosed herein are methods for making precursor solutions for nano-engineered carbon materials. In one embodiment, a precursor solution is used to make a nano-engineered carbon material. In another embodiment, a precursor solution is used to make a carbon aerogel. In a further embodiment, a precursor solution is used to make a carbon xerogel. In yet another embodiment, a nano-engineered carbon material is any aerogel or xerogel with a framework primarily comprised of organic polymers. In still another embodiment, a precursor solution is used to make carbon foam. In still yet another embodiment, a precursor solution is used to make carbon filter paper. One of ordinary skill in the art will readily understand the uses and applications for the precursor solutions taught herein.

Creating the Component Mixture

A precursor solution according to the present disclosure may be formed using sol-gel chemistry processes. In some embodiments of the methods disclosed herein for making precursor solutions, at least one component mixture is formed. In one embodiment, the at least one component mixture comprises at least one resorcinol compound and water. In another embodiment, the at least one component mixture comprises at least one resorcinol compound, water, and at least one catalyst. In yet another embodiment, the at least one component mixture comprises at least one resorcinol compound, water, at least one catalyst, and at least one additive. One of ordinary skill in the art will readily understand the component mixtures appropriate for making the precursor solutions taught herein.

The at least one resorcinol compound may be any compound or derivative of resorcinol now known or hereinafter discovered. The at least one resorcinol compound may also be any compound from which resorcinol or any resorcinol derivative can be derived. In one embodiment, the at least one resorcinol compound is resorcinol (i.e., benzene-1,3-diol, 1,3-dihydroxybenzene). In another embodiment, the at least one resorcinol compound is a derivative of resorcinol. In yet another embodiment, the at least one resorcinol compound is any compound from which resorcinol can be derived. Appropriate resorcinol compounds for use in the methods disclosed herein will be readily apparent to those skilled in the art.

In one embodiment, the at least one resorcinol compound is a polyhydroxybenzene. In another embodiment, the at least one resorcinol compound is a dihydroxybenzene. In yet another embodiment, the at least one resorcinol compound is a trihydroxybenzene. In still another embodiment, the at least one resorcinol compound is a substituted form of resorcinol.

In one embodiment, the at least one resorcinol compound is represented by the formula (I):

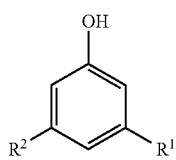

(I)

wherein $R^1$ is chosen from H, OH, $C_{1-5}$ alkyl, or $OR^3$, wherein $R^2$ is chosen from H, OH, $C_{1-5}$ alkyl, or $OR^3$, wherein $R^3$ is chosen from $C_{1-5}$ alkyl or $C_{1-5}$ aryl, and wherein at least one of $R^1$ and $R^2$ is OH.

In another embodiment, the at least one resorcinol compound is represented by formula (II):

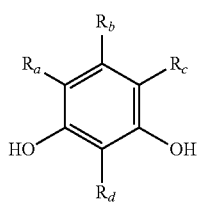

(II)

wherein each of $R_a$, $R_b$, $R_c$, and $R_d$ is independently hydrogen; hydroxy; halide such as fluoride, chloride, bromide or iodide; nitro; benzo; carboxy; acyl such as formyl, alkylcarbonyl (e.g. acetyl) and arylcarbonyl (e.g. benzoyl); alkyl such as methyl, ethyl, propyl, butyl, pentyl, hexyl, heptyl, octyl, nonyl, decyl and the like; alkenyl such as unsubstituted or substituted vinyl and allyl; unsubstituted or substituted methacrylate, unsubstituted or substituted acrylate; silyl ether; siloxanyl; aryl such as phenyl and naphthyl; aralkyl such as benzyl; or alkaryl such as alkylphenyls, and
wherein at least two of $R_a$, $R_c$, and $R_d$ is hydrogen.

Exemplary resorcinol compounds include, but are not limited to, resorcinol, phenol, catechol, hydroquinone, pyrogallol, 5-methylresorcinol, 5-ethylresorcinol, 5-propylresorcinol, 4-methylresorcinol, 4-ethylresorcinol, 4-propylresorcinol, resorcinol monobenzoate, resorcinol monosinate, resorcinol diphenyl ether, resorcinol monomethyl ether, resorcinol monoacetate, resorcinol dimethyl ether, phloroglucinol, benzoylresorcinol, resorcinol rosinate, alkyl substituted resorcinol, aralkyl substituted resorcinol, 2-methylresorcinol, phloroglucinol, 1,2,4-benzenetriol, 3,5-dihydroxybenzaldehyde, 2,4-dihydroxybenzaldehyde, 4-ethylresorcinol, 2,5-dimethylresorcinol, 5-methylbenzene-1,2,3-triol, 3,5-dihydroxybenzyl alcohol, 2,4,6-trihydroxytoluene, 4-chlororesorcinol, 2',6'-dihydroxyacetophenone, 2',4'-dihydroxyacetophenone, 3',5'-dihydroxyacetophenone, 2,4,5-trihydroxybenzaldehyde, 2,3,4-trihydroxybenzaldehyde, 2,4,6-trihydroxybenzaldehyde, 3,5-dihydroxybenzoic acid, 2,4-dihydroxybenzoic acid, 2,6-dihydroxybenzoic acid, 1,3-dihydroxynaphthalene, 2',4'-dihydroxypropiophenone, 2',4'-dihydroxy-6'-methylacetophenone, 1-(2,6-dihydroxy-3-methylphenyl) ethanone, 3-methyl 3,5-dihydroxybenzoate, methyl 2,4-dihydroxybenzoate, gallacetophenone, 2,4-dihydroxy-3-methylbenzoic acid, 2,6-dihydroxy-4-methylbenzoic acid, methyl 2,6-dihydroxybenzoate, 2-methyl-4-nitroresorcinol, 2,4,5-trihydroxybenzoic acid, 3,4,5-trihydroxybenzoic acid, 2,3,4-trihydroxybenzoic acid, 2,4,6-trihydroxybenzoic acid, 2-nitrophloroglucinol or a combination thereof.

At least one catalyst may be used in the methods disclosed herein. In one embodiment, the at least one catalyst is any catalyst now known or later discovered to be suitable for the condensation reaction of phenolic compounds with aldehydes. One of ordinary skill in the art will readily understand the range of catalysts appropriate for practicing the methods disclosed herein. In one embodiment, the at least one catalyst is a basic catalyst. Exemplary basic catalysts include, but are not limited to metal oxides, such as sodium hydroxide, sodium carbonate, sodium bicarbonate, magnesium oxide, calcium oxide, barium oxide, zeolite, and potassium fluoride. In another embodiment, the at least one catalyst is an acidic catalyst. Exemplary acidic catalysts include, but are not limited to, acetic acid, hydrochloric acid, sulfuric acid, phosphoric acid, phosphorous acid, and sulfonic acid (including but not limited to monosulfonic acid, disulfonic acid, trisulfonic acid, toluene sulfonic acid, and alkane sulfonic acid). In one embodiment, the at least one catalyst is acetic acid. In another embodiment, the at least one catalyst is sodium carbonate. In one embodiment, the at least one catalyst is used in an amount ranging from 0.01 to 10 parts per 100 parts of the at least one resorcinol compound. In another embodiment, the molar ratio of the at least one resorcinol compound to catalyst is 5:1.

The component mixture may additionally comprise at least one additive. Exemplary additives include, but are not limited to, sulfur, carbon black, antioxidants, zinc oxide, accelerators, cellulose, filler, rheology modifiers, thickeners, surfactants, wetting agents, colorants, lubricants, leveling agents, UV stabilizers, plasticizers, silica, processing oils, softening oils, bloating agents, or mixtures thereof. In one embodiment, the at least one additive may be at least one solvent. In one embodiment, the at least one solvent is organic. In another embodiment, the at least one solvent is inorganic. Exemplary solvents include, but are not limited to, methyl alcohol, ethyl alcohol, n-propyl alcohol, isopropyl alcohol, butanol, acetone, tetrahydrofuran, benzene, toluene, xylene, ethylbenzene, cumene, mesitylene, or mixtures thereof. One of ordinary skill in the art would readily understand the range of additives that may be employed successfully in the methods disclosed herein.

In one embodiment, the component mixture is created at room temperature. In another embodiment, the component mixture is created at a temperature ranging from 20° C. to 25° C. In yet another embodiment, the component mixture is created at a temperature ranging from 22° C. to 24° C. In still another embodiment, the component mixture is created at a temperature below room temperature. In a further embodiment, the component mixture is created at a temperature above room temperature.

Heating the Component Mixture

The component mixture may then be heated. In one embodiment, the component mixture is heated to a temperature ranging from 10° C. to 100° C. In another embodiment, the component mixture is heated to a temperature from 30° C. to 99° C. In yet another embodiment, the component mixture is heated to 50° C. In still another embodiment, the component mixture is heated to 60° C. In a further embodiment, the component mixture is heated to 70° C. In a further embodiment, the component mixture is heated above 30° C., 40° C., 50° C., 60° C., or 70° C. One of ordinary skill in the art would readily understand appropriate temperatures for use in practicing the methods disclosed herein.

Programmed-Addition of at Least One Cross-Linking Agent

In the methods disclosed herein, at least one cross-linking agent may be added to the component mixture by programmed-addition, wherein the cross-linking agent is added to the component mixture at a controlled rate (either in batches or in a continuous stream) so that the reaction between the cross-linking agent and component mixture can be maintained at a lower temperature level and resulting in a controlled exothermic reaction. In one embodiment, the at least one cross-linking agent is any agent now known or herein after discovered capable of reacting with the at least one resorcinol compound to form a polymeric matrix. In another embodiment, the at least one cross-linking agent is any agent capable of donating methylene groups. In one embodiment, the methylene donor compound is any compound capable of generating formaldehyde by heating. In another embodiment, the at least one cross-linking agent is an aldehyde. Exemplary cross-linking agents include, but are not limited to, formaldehyde, paraformaldehyde, trioxane, methyl formcel, n-butyl formcel, acetaldehyde, propionaldehyde, ureaformaldehyde, methylolurea, hexamethylene tetramine, anhydroformaldehydeaniline, butyraldehyde, benzaldehyde crotanaldehyde, cinnamaldehyde, benzaldehyde, furfural, acetone, methyl ethyl ketone, hexamethylenetetramine, hexamethoxymethylmelamine, lauryloxymethylpyridinium chloride, ethyloxymethylpyridinium choride, trioxane hexamethylolmelamine, N-substituted oxymethylmelamines, alkyl aldehydes (including, but not limited to n-butyraldehyde, isobutyraldehyde, and valeraldehyde), glyoxal, melamineformaldehyde, and mixtures thereof. In one embodiment, the at least one cross-linking agent is formaldehyde (i.e., menthanal). In another embodiment, the at least one cross-linking agent is a mixture of formaldehyde and butyraldehyde. In some embodiments, the at least one cross-linking agent is mixed with water or an aqueous solvent. In embodiments where a mixture of cross-linking agents is used, they can be added to the reaction individually, simultaneously, or sequentially. The at least one cross-linking agent may be used alone or in a mixture with an aqueous solvent (e.g., water or alcohols). In one embodiment, the at least one cross-linking agent is a 50% formaldehyde solution in water.

In one embodiment, the at least one cross-linking agent is an aldehyde of formula (III):

$$R^4-CH=O \tag{III}$$

wherein $R^4$ is H, alkyl, alkenyl, substituted alkyl or substituted aryl. In one embodiment, the alkyl is a $C_{1-5}$ alkyl such as methyl, ethyl, propyl, isopropyl, butyl, isobutyl, or pentyl.

In one embodiment, the at least one cross-linking agent is an unsaturated aliphatic aldehyde compound. In another embodiment, the at least one cross-linking agent is an unsaturated aliphatic aldehyde compound of formula (IV):

wherein R', R'', and R''' are individually a hydrogen or hydrocarbyl group. In one embodiment, the hydrocarbyl group is branched. In another embodiment, the hydrocarbyl group is straight. Exemplary unsaturated aliphatic aldehyde compounds include, but are not limited to, crotanaldehyde, acrolein, and methacrolein.

In yet another embodiment, the at least one cross-linking agent is an aliphatic dialdehyde compound represented by formula (V):

$$O=CH-(CH_2)_n-CH=O \tag{V}$$

wherein "n" is a polymerization number providing the number of repeat units in a polymer, is greater than or equal to 1. Exemplary aliphatic dialdehyde compounds include, but are not limited to, malonaldehyde, succinaldehyde, glutaraldehyde, and adipaldehyde.

The molar ratio of the at least one resorcinol compound to the at least one cross-linking agent may be adjusted in the methods disclosed herein. In one embodiment, the molar ratio of the at least one resorcinol compound to the at least one cross-linking agent ranges from 1:1 to 1:5. In another embodiment, the molar ratio ranges from 1:1.5 to 1:2.5. In yet another embodiment, the molar ratio is 1:2. One of ordinary skill in the art will readily understand the ranges of molar ratios appropriate for use in the methods disclosed herein.

Once the necessary amount of the at least one cross-linking agent is selected, the cross linking agent may be added to the heated component mixture by a programmed-addition method. In one embodiment, the at least one cross-linking agent is divided into smaller batches such that when the batch of the at least one cross-linking agent reacts with the at least one resorcinol compound, the maximum temperature increase resulting from the reaction occurring in the mixing step will not exceed 10° C. per minute. In another embodiment, once the at least one cross-linking agent is divided into batches, a batch of the at least one cross-linking agent is added to the heated component mixture. In yet another embodiment, the maximum temperature increase resulting from the reaction occurring in the mixing step will not exceed at least one of the following 15° C., 10° C., 8° C., or 5° C. per minute. In yet another embodiment, the resulting solution is maintained at a reaction temperature ranging from 30° C. to 99° C. using, for instance, cooling coils. Then, in some embodiments, the remaining batches are added stepwise to the solution, maintaining the reaction temperature ranging from 30° C. to 99° C. using, for instance, cooling coils. In one embodiment, once all batches are added, the reaction temperature is maintained at a temperature ranging from 30° C. to 99° C. until the reaction between the at least one resorcinol compound and the at least one cross-linking agent is completed. In another embodiment, the at least one cross-linking agent is added in a continuous feed such that the maximum increase resulting from the reaction between the at least one resorcinol compound and the at least one cross-linking agent will not exceed at least one of the following 15° C., 10° C., 8° C., or 5° C. per minute. In another embodiment, once the reaction is complete, the solution is cooled. In yet another embodiment, the solution is cooled to stop the reaction at a time before at least one cross-linking agent and the at least one resorcinol compound have reacted completely. The cooled solution may then be stored for further processing.

During the programmed-addition of the at least one cross-linking agent, the temperature may be maintained at a reaction temperature. In one embodiment, the reaction temperature is 50° C. In another embodiment, the reaction temperature is 60° C. In yet another embodiment, the reaction temperature ranges from 40° C. to about 80° C. In still another embodiment, the reaction temperature ranges from about 45° C. to about 55° C.

The reaction temperature may be maintained by any means now known or hereinafter discovered for cooling or heating. In one embodiment, the reaction temperature is maintained by a heat exchanger. In another embodiment, the reaction temperature is maintained by cooling coils, heating coils, or a combination thereof. In yet another embodiment, the reaction temperature is maintained by a heating mantle. In still another embodiment, the reaction temperature is maintained by a combination of heating devices and cooling devices. Those of ordinary skill in the art will readily understand the available heating and cooling mechanisms that may be employed to maintain the reaction temperature according to the methods disclosed herein.

Optional Additional Steps

At least one alcohol may be added at any time during the production of the precursor solution. The addition of at least one alcohol may slow the reaction rate of the mixture or may be used to prevent rapid hardening of the solution to a sol-gel. In one embodiment, the at least one alcohol is methanol. In another embodiment, the at least one alcohol is a polyhydric alcohol such as, but are not limited to, diethylene glycol, 1,2-propane diol, 1,4-butane diol, or 1,5-hexane diol. One of ordinary skill in the art will readily understand the appropriate range of alcohols that could be used successfully in the methods taught herein.

The refractive index of the precursor solution varies with time. Monitoring the refractive index may help for determining the quality and consistency of the properties in the final product. The refractive index of the precursor solution may be monitored throughout the production of the precursor solution. One of ordinary skill in the art would readily understand how to measure the refractive index of the precursor solutions taught herein. In one embodiment, the reaction of the at least one resorcinol compound and the at least one cross-linking agent is stopped when a refractive index measurement ranging from 1.4000 to 1.4300 is obtained.

Methods of Making a Sol-Gel for Nano-Engineered Carbon Materials

Disclosed herein are methods for making a sol-gel for use in making, for example, nano-engineered carbon materials. In one embodiment, a sol-gel is used to make a carbon aerogel. In another embodiment, a sol-gel is used to make a carbon xerogel. In yet another embodiment, a sol-gel is used to make any aerogel with a framework primarily comprised of organic polymers. In still another embodiment a sol-gel is used to make a carbon foam. In a further embodiment, a sol-gel is used to make a carbon filter paper. One of ordinary skill in the art will readily understand uses of the sol-gels taught herein.

In one embodiment, the at least one nano-engineered carbon material is prepared through a sol-gel chemistry process. Appropriate sol-gel process techniques would be readily apparent to one of ordinary skill in the art. The sol-gel process may begin with any solution containing small molecules with the ability to link together (i.e., polymerize) to form larger molecular clusters that could eventually grow into nanoparticles dispersed through the solution (i.e., a sol). Those nanoparticles may then be coaxed into interconnecting (i.e., cross-linking) to form a continuous network of interconnected nanoparticles that spans the volume of the liquid solution (i.e., a sol-gel).

The sol-gels disclosed herein may be made by subjecting the precursor solution, disclosed herein, to at least one heat treatment.

The at least one heat treatment may be selected to achieve a variety of porosities in the sol-gels manufactured therefrom. In one embodiment, the at least one heat treatment involves sealing the precursor solution in a container and heating it to a temperature ranging from 60° C. to 99° C. in an oven for an amount of time ranging from 12 hours to 96 hours. In another embodiment, the at least one heat treatment involves sealing the precursor solution in a container and heating it to 80° C. in an oven for 24 hours, resulting in a mesoporous sol-gel. In yet another embodiment, the at least one heat treatment involves maintaining the precursor solution at room temperature for 3-4 days and then placing it in an oven at 80° C. for 24 hours, resulting in a microporous sol-gel.

Methods of Making a Nano-Engineered Carbon Material

Disclosed herein are methods for making nano-engineered carbon materials from the precursor solutions and sol-gels disclosed herein. In one embodiment, the at least one nano-engineered carbon material is a carbon aerogel. In another embodiment, the at least one nano-engineered carbon material is a carbon xerogel. In yet another embodiment, the at least one nano-engineered carbon material is any aerogel or xerogel with a framework primarily comprised of organic polymers. In still another embodiment, the at least one nano-engineered carbon material is a carbon foam. In still yet another embodiment, the at least one nano-engineered carbon material is a carbon filter paper.

Making a Nano Engineered Carbon Material from a Sol-Gel

At least one nano-engineered carbon material may be made from the sol-gels disclosed herein. In one embodiment, the sol-gel is subject to grinding. In another embodiment, the sol-gel is subject to freeze drying. In yet another embodiment, the sol-gel is subject to cryogenic drying in liquid nitrogen. In still another embodiment, the sol-gel is subject to pyrolysis. In a further embodiment, the sol-gel is subject to supercritical drying. In another embodiment, the sol-gel is subject to vacuum drying. In still another embodiment, the sol-gel is subject to evaporation drying. In yet a further embodiment, the sol-gel is subject to heating to a temperature ranging from 800° C. to 1000° C. The above-mentioned steps may be used alone or in combination with each other or with other techniques known or hereinafter discovered for making nano-engineered carbon materials.

In one embodiment, a carbon aerogel is formed from a sol-gel by: (1) grinding the sol-gel into chunks; (2) subjecting the ground sol-gel to freeze-drying or supercritical drying; (3) using vacuum drying to expel the water; (4) grinding the resulting solid into a fine powder; and (5) pyrolyzing the powder at inert conditions at a temperature ranging from 800° C. to 1000° C. In another embodiment, a carbon xerogel is formed from a sol-gel by: (1) maintaining the sol-gel at room temperature allowing the water to evaporate naturally from the sol-gel; (2) grinding the resulting dried solid into a fine powder; and (3) pyrolyzing the powder at inert conditions at a temperature ranging from 800° C. to 1000° C. One of ordinary skill in the art would readily understand the range of methods and techniques that are appropriate for making nano-engineered carbon materials from the sol-gels according to the invention disclosed herein.

Properties of the at Least One Nano-Engineered Carbon Material

The at least one nano-engineered carbon material disclosed herein may have at least one advantageous property. In one embodiment, the at least one nano-engineered carbon material is less friable than a nano-engineered inorganic material such as an inorganic aerogel. In another embodiment, the at least one nano-engineered carbon material is less fragile than a nano-engineered inorganic material such as an inorganic aerogel.

The at least one nano-engineered carbon material disclosed herein may be manufactured in a variety of densities. In one embodiment, the at least one nano-engineered carbon material has a density of less than 0.02 g/cm$^3$. In another embodiment, the at least one nano-engineered carbon material has a density ranging from 0.02 g/cm$^3$ to 0.5 g/cm$^3$. In yet another embodiment, the at least one nano-engineered carbon material has a density of at least 0.5 g/cm$^3$.

The at least one nano-engineered carbon material disclosed herein may be manufactured in a variety of surface areas. In one embodiment, the at least one nano-engineered carbon material has a surface area ranging from 500 m$^2$/g to 2500 m$^2$/g.

The at least one nano-engineered carbon material disclosed herein may be manufactured in a variety of electrical conductivities. The at least one nano-engineered carbon material disclosed herein may also be manufactured in a variety of chemical purities. In one embodiment, the at least one nano-engineered carbon material is substantially free of impurities. In another embodiment, the at least one nano-engineered material is substantially free of metal ions. In yet another embodiment, the at least one nano-engineered carbon material is manufactured at a high enough level of purity for use in a high-voltage electrode.

The nano-engineered carbon materials disclosed herein may undergo at least one additional processing step. In one embodiment, the at least one additional processing step involves increasing the surface area of the at least one nano-engineered carbon material by placing it under a flow of steam or hydrogen at elevated temperatures (e.g., ranging from 400° C. to 1000° C.). In that embodiment, the water and hydrogen react with carbon in the nano-engineered carbon material to form gaseous products and etch micropores throughout the interior of the aerogel to increase the surface area of the at least one nano-engineered carbon material. In one embodiment, the micropores are less than 4 nanometers in diameter. In another embodiment, the micropores are less than 2 nanometers in diameter. In yet another embodiment, the micropores are less than 1 nanometer in diameter. In still another embodiment, the at least one nano-engineered carbon material is mesoporous and has pores ranging from 2 nanometers to 50 nanometers. In one embodiment, the surface area of the at least one nano-engineered carbon material is increased up to 2500 m$^2$/g. In another embodiment, the surface area of the at least one nano-engineered carbon material is increased up to 2000 m$^2$/g. In yet another embodiment, the surface area of the at least one nano-engineered carbon material is increased up to 1500 m$^2$/g.

Uses for Nano-Engineered Carbon Materials

The carbon aerogel products disclosed herein may be used in any application now known to the skilled artisan or hereafter discovered.

Exemplary applications include, but are not limited to, electrodes, supercapacitors, fuel cells, composite materials, reinforcing agents, pigments, insulators, in media for gas separation or storage, controlled-release agent carriers, electro-chemical storage devices, catalysts, architectural daylighting, oil and gas pipelines, coatings formulations, foams, papers, industrial and cryogenic plants and vessels, outdoor gear and apparel, and personal care products.

Unless otherwise indicated to the contrary, all numbers expressing quantities of ingredients, reaction conditions, and so forth used in the specification, including claims, are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the disclosure are approximations, unless otherwise indicated the numerical values set forth in the specific examples are reported as precisely as possible. Any numerical values, however, inherently contain certain errors necessarily resulting from the standard deviation found in their respective testing measurements. The section headings used in this disclosure are provided merely for the convenience of the reader and are not intended to limit the scope of the inventions described herein.

Other embodiments of the disclosure will be apparent to those skilled in the art from consideration of the specification and practice of the inventions disclosed herein. It is intended that the specification and examples be considered as exemplary only, with a true scope and spirit of the disclosure being indicated by the following claims.

In one embodiment, the present invention is:

1. A method of producing a precursor solution comprising:
  creating at least one component mixture comprising water, at least one resorcinol compound, and at least one catalyst;
  heating the at least one component mixture to a temperature ranging from 30° C. to 99° C. to create a heated component mixture; and
  adding at least one cross-linking agent to the heated component mixture by a programmed-addition method comprising:
    an optional dividing step, wherein the at least one cross-linking agent is divided into batches;
    a mixing step, wherein a solution is created by adding one of a plurality of batches of the at least one cross-linking agent to the heated component mixture;

a cooling step, wherein the solution is cooled to a temperature ranging from 30° C. to 99° C.;

an optional repeating step, wherein the mixing and cooling steps are repeated as necessary to consume all of the remaining of the plurality of batches of the at least one cross-linking agent to create a final solution; and wherein each batch comprises an amount of the at least one cross-linking agent sufficient to prevent the maximum temperature increase resulting from the reaction occurring in the mixing step from exceeding 10° C. per minute;

maintaining the temperature of the final solution at a temperature ranging from 45° C. to 55° C. for an amount of time ranging from 15 minutes to 480 minutes; and cooling the final solution to a temperature of less than 40° C.

2. The method of any of the preceding paragraphs, wherein the at least one component mixture is mixed at a temperature ranging from 20° C. to 25° C.

3. The method of any of the preceding paragraphs, wherein the at least one resorcinol compound is represented by the formula (I):

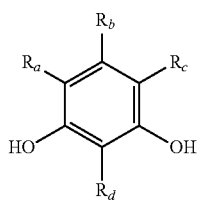

wherein each $R_a$, $R_b$, $R_c$, and $R_d$ is independently selected from a group consisting of: hydrogen; hydroxy; a halide such as fluoride, chloride, bromide or iodide; nitro; benzo; carboxy; acyl such as formyl, alkyl-carbonyl (e.g. acetyl) and arylcarbonyl (e.g. benzoyl); alkyl such as methyl, ethyl, propyl, butyl, pentyl, hexyl, heptyl, octyl, nonyl, decyl and the like; alkenyl such as unsubstituted or substituted vinyl and allyl; unsubstituted or substituted methacrylate, unsubstituted or substituted acrylate; silyl ether; siloxanyl; aryl such as phenyl and naphthyl; aralkyl such as benzyl; or alkaryl such as alkylphenyls; and wherein at least two of $R_a$, $R_c$, and $R_d$ is hydrogen.

4. The method of any of the preceding paragraphs, wherein the at least one resorcinol compound is benzene-1, 3-diol.

5. The method of any of the preceding paragraphs, wherein the at least one resorcinol compound is chosen from phenol, derivatives of phenol, or phenol and its derivatives.

6. The method of any of the preceding paragraphs, wherein the at least one catalyst is acetic acid.

7. The method of any of the preceding paragraphs, wherein the at least one cross-linking agent is selected from a group consisting of: formaldehyde, paraformaldehyde, trioxane, methyl formcel, acetaldehyde, propionaldehyde, butyraldehyde, crotanaldehyde, cinnamaldehyde, benzaldehyde, furfural, acetone, methyl ethyl ketone, and mixtures thereof 8. The method of any of the preceding paragraphs, wherein the at least one cross-linking agent is formaldehyde.

9. The method of any of the preceding paragraphs, wherein the molar ratio of the at least one resorcinol compound to the at least one cross-linking agent ranges from 1:1 to 1:3.

10. The method of any of the preceding paragraphs, wherein the component mixture is heated to at least 40° C.

11. The method of any of the preceding paragraphs, wherein the component mixture is heated to 50° C.

12. The method of any of the preceding paragraphs, wherein the component mixture is heated to at least 60° C.

13. The method of any of the preceding paragraphs, wherein the at least one cross-linking agent is added as a continuous feed in the mixing step.

14. The method of any of the preceding paragraphs, wherein the at least one cross-linking agent is added as a multi-step batch addition in the mixing step.

15. The method of any of the preceding paragraphs, further comprising the addition of at least one alcohol.

16. The method of any of the preceding paragraphs, wherein the at least one alcohol is methanol.

17. The method of any of the preceding paragraphs, further comprising shining a light into the reactor to monitor the completion of the reaction by measuring the refractive index of the materials.

18. A method for making a sol-gel comprising:

preparing a precursor solution according to claim 0; and subjecting the precursor solution to at least one heat treatment at a temperature ranging from 60° C. to 99° C. for an amount of time ranging from 12 hours to 96 hours.

19. The method of any of the preceding paragraphs, wherein the at least one heat treatment comprises heating the precursor solution to a temperature ranging from 60° C. to 99° C. for 24 to 48 hours, said at least one heat treatment resulting in the formation of a mesoporous sol-gel.

20. The method of any of the preceding paragraphs, wherein the at least one heat treatment comprises:

maintaining the precursor solution at a temperature ranging from 10° C. to 40° C. for 1 to 30 days; and heating the precursor/pregelled solution to a temperature ranging from 60° C. to 99° C. for 24 to 96 hours, said at least one heat treatment resulting in the formation of a microporous sol-gel.

21. A method for making a nano-engineered carbon material comprising:

preparing a sol-gel according to claim Error! Reference source not found.;

subjecting the sol-gel to at least additional treatment.

22. The method of any of the preceding paragraphs, wherein the at least one additional treatment comprises grinding, freeze drying, cryogenic drying, supercritical drying, vacuum drying, evaporation drying, pyrolysis, or a combination thereof.

23. The method of any of the preceding paragraphs, wherein the resulting nano-engineered carbon material is a carbon aerogel.

24. The method of any of the preceding paragraphs, wherein the resulting nano-engineered carbon material is a carbon xerogel.

By way of non-limiting illustration, examples of certain embodiments of the present disclosure are given below.

EXAMPLES

Example 1

(Comparative): Dumping All Formaldehyde Under Adiabatic Conditions

The first example is a comparative example illustrating a reaction of resorcinol and formaldehyde in the presence of a catalyst at adiabatic conditions. First, a reaction kettle with a mechanical stirrer and thermometer was added with 802.2 grams of water. Then, 59.2 grams of glacial acetic acid (supplied by Fisher Scientific, Inc.) was added to the reaction kettle, while the mixture was being stirred (i.e., under stirring), at room temperature. Next, 544.8 grams of resorcinol (supplied by Sigma-Aldrich, Inc.) were then added to the reaction kettle under stirring. The addition of resorcinol caused an endothermic decrease in temperature. At this point, the refractive index was measured by a refractometer (supplied by Bellingham Stanley Ltd., Model #RRM330) to be 1.4025.

Then, the reaction mixture was slowly heated to reach a temperature of 50° C. As soon as the temperature reached 50° C., 593.8 grams of the formaldehyde (50% solution in water stored at 50° C., supplied by Georgia-Pacific) was added quickly under stirring. At this point, the refractive index was measured by a refractometer (supplied by Bellingham Stanley Ltd., Model #RRM330) to be 1.4184.

After the addition of the formaldehyde, the temperature of the reaction was recorded every minute. To get complete exotherm information, the reaction was allowed to proceed until gelation. Then, the refractive index was measured by a refractometer (supplied by Bellingham Stanley Ltd., Model #RRM330) to be 1.4297. The results of that experiment are shown in Table 1.

TABLE 1

Temperature and Exotherm Data for the Reaction Between Resorcinol and Formaldehyde Under Adiabatic Conditions

| Clock Time | Time after formaldehyde addition (min) | Temperature (° C.) | Heat Capacity (cal/gm-C.) | Exotherm (BTU/lb-min) | Kick Point |
|---|---|---|---|---|---|
| 12:10 PM | | Heating | | | |
| 12:15 PM | | " | | | |
| 12:20 PM | | " | | | |
| 1:38 PM | | " | | | |
| 1:39 PM | 0 | 50.2 | 0.79 | | 64 |
| 1:40 PM | 1 | 50.4 | 0.79 | 0.3 | 64 |
| 1:42 PM | 2 | 50.4 | 0.79 | 0.0 | 64 |
| 1:43 PM | 3 | 50.6 | 0.79 | 0.3 | 64 |
| 1:44 PM | 4 | 51.2 | 0.79 | 0.9 | 64 |
| 1:45 PM | 5 | 51.6 | 0.79 | 0.6 | 64 |
| 1:46 PM | 6 | 52.3 | 0.79 | 1.0 | 64 |
| 1:47 PM | 7 | 52.9 | 0.79 | 0.9 | 64 |
| 1:48 PM | 8 | 53.4 | 0.79 | 0.7 | 64 |
| 1:49 PM | 9 | 54.1 | 0.79 | 1.0 | 64 |
| 1:50 PM | 10 | 54.7 | 0.79 | 0.9 | 64 |
| 1:51 PM | 11 | 55.4 | 0.79 | 1.0 | 64 |
| 1:52 PM | 12 | 56.1 | 0.79 | 1.0 | 64 |
| 1:53 PM | 13 | 56.9 | 0.79 | 1.1 | 64 |
| 1:54 PM | 14 | 57.7 | 0.79 | 1.1 | 64 |
| 1:55 PM | 15 | 58.6 | 0.79 | 1.3 | 64 |
| 1:56 PM | 16 | 59.6 | 0.79 | 1.4 | 64 |
| 1:57 PM | 17 | 60.6 | 0.79 | 1.4 | 64 |
| 1:58 PM | 18 | 61.7 | 0.81 | 1.6 | 64 |
| 1:59 PM | 19 | 62.8 | 0.81 | 1.6 | 64 |
| 2:00 PM | 20 | 64.2 | 0.81 | 2.1 | 64 |
| 2:01 PM | 21 | 65.6 | 0.81 | 2.1 | |
| 2:02 PM | 22 | 67.3 | 0.81 | 2.5 | |
| 2:03 PM | 23 | 69.1 | 0.81 | 2.6 | |
| 2:04 PM | 24 | 71.2 | 0.81 | 3.1 | |
| 2:05 PM | 25 | 73.6 | 0.81 | 3.5 | |
| 2:06 PM | 26 | 76.4 | 0.81 | 4.1 | |
| 2:07 PM | 27 | 79.6 | 0.85 | 4.9 | |
| 2:08 PM | 28 | 83.3 | 0.85 | 5.7 | |
| 2:09 PM | 29 | 87.7 | 0.85 | 6.7 | |
| 2:10 PM | 30 | 92.7 | 0.85 | 7.6 | |
| 2:11 PM | 31 | 98.6 | 0.85 | 9.0 | |

The exotherm value was observed in the range of 0.3 to 9.0 BTU/lb-min (or 18 to 540 BTU/lb-hr). FIG. 1 demonstrates the results of this experiment. As can be seen in FIG. 1, the graph showed higher slope above 64° C. (the kick point), showing that the exotherm is much higher when the temperature goes above 64° C.

Example 2

(Comparative): Dumping All Formaldehyde Under Cooling Conditions

First, accurate coil flow rate data was obtained using a peristaltic pump equipped with a precision speed control (MASTERFLEX® 7521-40), with a MASTERFLEX® Easy Load head (Model 7518-12) and ¼'" ID TYGON® tubing was used to deliver cooling water to the reactor coils. The pump was calibrated by pumping water for three minutes at a given setting on the 10-turn speed control dial and collecting the water. The water collected was weighed and the rate of grams of water per minute was calculated. The pump was found to be linear over a range of settings that resulted in flow rates from about 200 grams per minute to over 1300 grams per minute.

A reaction kettle with mechanical stirrer, thermometer, and internal cooling coils had 802.2 grams of water added to it. Then, 59.2 grams of Glacial acetic acid (supplied by Fisher Scientific, Inc.) was added under stirring at room temperature. Next, 544.8 grams of resorcinol (supplied by Sigma-Aldrich, Inc.) was added to the reaction kettle under stirring. The addition of resorcinol caused an endothermic decrease in temperature. The refractive index was measured using a refractometer (supplied by Bellingham Stanley Ltd, Model #RFM330) to be 1.4205.

The reaction mixture was heated slowly to reach a temperature of 50° C. Without adjusting the heating, the reaction temperature was maintained at 50° C. by cooling water passing through internal cooling coils. The temperature of water going into and coming out of the cooling coils was recorded by a computer connected to a temperature probe. The temperatures were recorded as inlet and outlet temperatures, respectively.

At 50° C., 593.8 grams of formaldehyde (50% solution in water stored at 50° C., supplied by Georgia-Pacific) was added quickly under stirring. After the addition of formaldehyde, the temperature of the reaction was recorded every minute. The refractive index was measured using a refractometer (supplied by Bellingham Stanley Ltd, Model #RFM330) to be 1.4184. To get complete exotherm information, the reaction was allowed to react until gelation, or formation of a gel. The results of this experiment are shown in Table 2.

TABLE 2

Temperature and Exotherm Data for the Reaction Between Resorcinol and Formaldehyde Under Cooling Conditions

| Data Pt sec | Time min | Batch Temperature deg C. | Inlet Temperature deg C. | Outlet Temperature deg C. | Coil Flow Rate grams/min | Avg'd lb/hr | Rxn Heating BTU/lb-hr |
|---|---|---|---|---|---|---|---|
| Avg |  | 50.66 | 20.60 | 47.21 | 267.62 | 35.368 | 45 |
| 1380 | 23 | 50.63 | 20.61 | 47.49 | 244.00 | 32.247 | 14 |
| 1440 | 24 | 50.58 | 20.31 | 47.72 | 259.00 | 34.229 | 43 |
| 1500 | 25 | 50.82 | 20.26 | 47.79 | 259.00 | 34.229 | 45 |
| 1560 | 26 | 50.72 | 20.51 | 47.12 | 259.00 | 34.229 | 32 |
| 1620 | 27 | 50.72 | 20.75 | 47.87 | 259.00 | 34.229 | 39 |
| 1680 | 28 | 50.82 | 20.90 | 47.27 | 275.00 | 36.344 | 52 |
| 1740 | 29 | 50.92 | 20.90 | 48.16 | 275.00 | 36.344 | 65 |
| 1800 | 30 | 50.77 | 20.70 | 47.42 | 275.00 | 36.344 | 57 |
| 1860 | 31 | 50.68 | 20.31 | 47.12 | 275.00 | 36.344 | 58 |
| 1920 | 32 | 50.68 | 20.56 | 47.12 | 275.00 | 36.344 | 55 |
| 1980 | 33 | 50.68 | 20.36 | 47.12 | 275.00 | 36.344 | 57 |
| 2040 | 34 | 50.23 | 20.65 | 46.52 | 275.00 | 36.344 | 44 |
| 2100 | 35 | 50.13 | 20.46 | 46.37 | 275.00 | 36.344 | 45 |
| 2160 | 36 | 50.48 | 20.70 | 46.67 | 269.00 | 35.551 | 37 |
| 2220 | 37 | 50.13 | 20.56 | 46.97 | 269.00 | 35.551 | 44 |
| 2280 | 38 | 50.58 | 20.51 | 47.94 | 269.00 | 35.551 | 59 |
| 2340 | 39 | 50.92 | 20.75 | 47.72 | 269.00 | 35.551 | 52 |
| 2400 | 40 | 50.63 | 20.90 | 47.72 | 269.00 | 35.551 | 50 |
| 2460 | 41 | 50.68 | 20.80 | 47.42 | 269.00 | 35.551 | 47 |
| 2520 | 42 | 50.82 | 20.85 | 47.34 | 272.00 | 35.947 | 49 |
| 2580 | 43 | 50.82 | 20.65 | 47.42 | 272.00 | 35.947 | 53 |
| 2640 | 44 | 50.92 | 20.65 | 47.72 | 272.00 | 35.947 | 58 |
| 2700 | 45 | 50.72 | 20.51 | 47.04 | 272.00 | 35.947 | 50 |
| 2760 | 46 | 50.72 | 20.56 | 47.34 | 272.00 | 35.947 | 54 |
| 2820 | 47 | 50.68 | 20.61 | 47.64 | 272.00 | 35.947 | 57 |
| 2880 | 48 | 50.72 | 20.56 | 47.49 | 272.00 | 35.947 | 56 |
| 2940 | 49 | 50.63 | 20.80 | 47.64 | 272.00 | 35.947 | 54 |
| 3000 | 50 | 51.07 | 20.75 | 47.42 | 272.00 | 35.947 | 52 |
| 3060 | 51 | 50.82 | 20.70 | 47.12 | 272.00 | 35.947 | 48 |
| 3120 | 52 | 50.77 | 20.75 | 47.12 | 272.00 | 35.947 | 47 |
| 3180 | 53 | 50.77 | 20.51 | 47.42 | 272.00 | 35.947 | 55 |
| 3240 | 54 | 50.48 | 20.80 | 47.27 | 272.00 | 35.947 | 49 |
| 3300 | 55 | 50.97 | 20.51 | 42.03 | 272.00 | 35.947 | 51 |
| 3360 | 56 | 50.68 | 20.36 | 47.12 | 272.00 | 35.947 | 53 |
| 3420 | 57 | 50.63 | 20.65 | 47.34 | 272.00 | 35.947 | 52 |
| 3480 | 58 | 50.68 | 20.41 | 47.19 | 272.00 | 35.947 | 53 |

Figure 2:
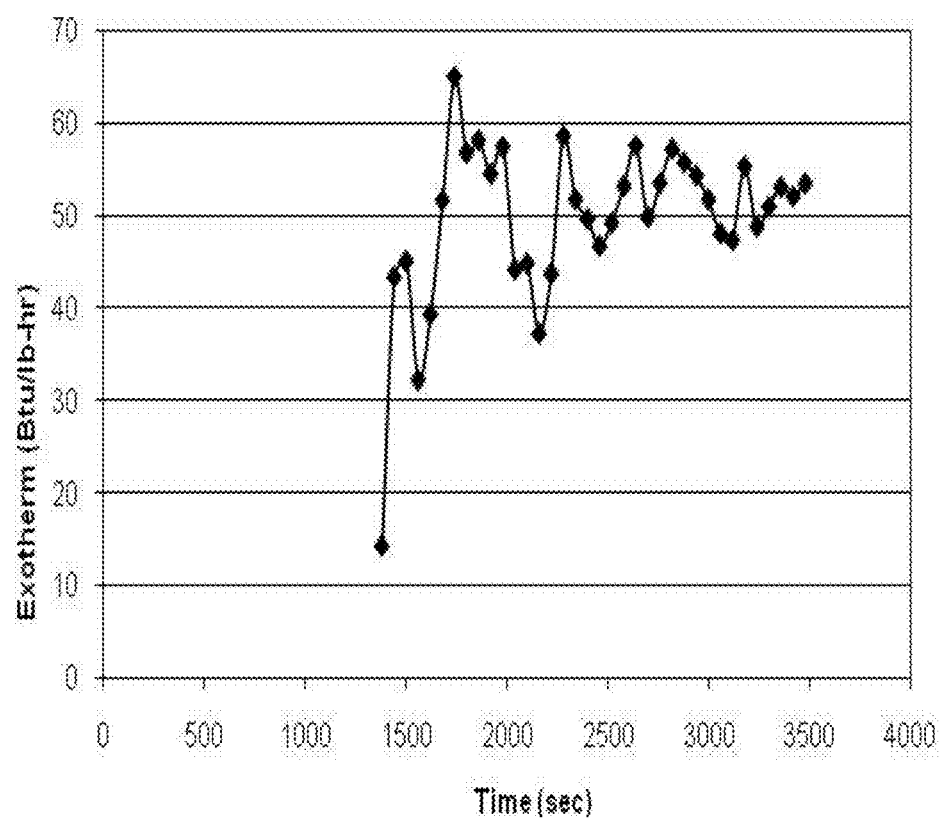
FIG. 2 is a graph demonstrating the exotherm (BTU/lb-hr) of a reaction between resorcinol and formaldehyde in the presence of a catalyst with cooling.

By maintaining the temperature of the reaction at 50° C., the exotherm value was observed in the range of 14 to 64 BTU/lb-hr. FIG. 2 demonstrates the results of this experiment. As can be seen in FIG. 2 and Table 2, the range of exotherm values is lower than the reaction that was allowed to run without cooling in Example 1.

Example 3

(Inventive): Reaction of Resorcinol and Formaldehyde in the Presence of a Catalyst Under Cooling Conditions with a Programmed-Addition of Formaldehyde To obtain accurate coil flow rate data, a peristaltic pump equipped with a precision speed control (MASTERFLEX® 7521-40), with a MASTERFLEX® Easy Load head (Model 7518-12) and 1/4"' ID TYGON® tubing was used to deliver cooling water to the DAQ reactor coils. The pump was calibrated by pumping water for three minutes at a setting on the 10-turn speed control dial and collecting the water. The water collected was weighed and the rate of grams of water per minute was calculated. The pump was found to be linear over a range of settings that resulted in flow rates from about 200 grams per minute to over 1300 grams per minute.

Then, a reaction kettle with mechanical stirrer, thermometer, and internal cooling coils was added with 802.2 grams of water. Then, 59.2 grams of Glacial acetic acid (supplied by Fisher Scientific, Inc.) was added under stirring at room temperature. Next, 544.8 grams of resorcinol (supplied by Sigma-Aldrich, Inc.) was added to a reaction vessel under stirring. The addition of resorcinol caused an endothermic decrease in temperature. At this point, the refractive index was measured by a refractometer (supplied by Bellingham Stanley Ltd., Model #RRM330) to be 1.4205

The reaction mixture was heated slowly to reach temperature of 50° C. With the same heating rate, the reaction temperature was maintained at 50° C. by cooling water passing through internal cooling coils. The temperature of water going into and coming out of coils was recorded by a computer connected to a temperature probe. The respective temperatures were recorded as inlet and outlet temperatures.

At 50° C., the addition of 593.8 grams of formaldehyde (50% solution in water stored at 50° C., supplied by Georgia-Pacific) started at a rate of 10 mL/min. During the addition of formaldehyde, the temperature of the reaction was recorded every minute.

In order to get complete exotherm information the reaction was allowed to react until gelation. At this point, the refractive index was measured by a refractometer (supplied by Bellingham Stanley Ltd., Model #RRM330) to be 1.4184. The results of this experiment are shown in Table 3.

TABLE 3

Temperature and Exotherm Data for the Reaction Between Resorcinol and Formaldehyde
Under Cooling Conditions with the Programmed-Addition of Formaldehyde

| Data Pt sec | Time min | Batch Temperature deg C. | Inlet Temperature deg C. | Outlet Temperature deg C. | Coil Flow Rate grams/min | Avg Coil Flow Rate lb/hr | Rxn Heating BTU/lb-hr | Accumulated Batch Lbs |
|---|---|---|---|---|---|---|---|---|
| bold range avg | | 50.61 | 20.76 | 47.96 | 244.65 | 32.333 | 19 | |
| 2400 | 40 | 50.18 | 20.65 | 47.57 | 215.00 | 28.414 | −27 | |
| 2460 | 41 | 50.28 | 20.56 | 47.72 | 224.00 | 29.604 | −11 | |
| 2520 | 42 | 50.38 | 20.85 | 47.72 | 224.00 | 29.604 | −15 | |
| 2580 | 43 | 50.43 | 20.61 | 48.09 | 224.00 | 29.604 | −7 | |
| 2640 | 44 | 50.92 | 20.65 | 48.24 | 224.00 | 29.604 | −6 | |
| 2700 | 45 | 50.97 | 20.65 | 48.69 | 224.00 | 29.604 | −1 | |
| 2760 | 46 | 51.36 | 20.65 | 48.84 | 224.00 | 29.604 | 1 | |
| 2820 | 47 | 51.36 | 20.90 | 48.31 | 224.00 | 29.604 | 0 | zero'd |
| 2880 | 48 | 51.61 | 20.95 | 47.87 | 234.00 | 30.925 | 0 | |
| 2940 | 49 | 51.66 | 20.75 | 47.94 | 234.00 | 30.925 | 21 | 4.195301 |
| 3000 | 50 | 51.66 | 20.70 | 48.69 | 234.00 | 30.925 | 30 | 4.214391 |
| 3060 | 51 | 51.76 | 20.65 | 48.54 | 234.00 | 30.925 | 27 | 4.23348 |
| 3120 | 52 | 51.81 | 21.09 | 48.31 | 234.00 | 30.925 | 17 | 4.25257 |
| 3180 | 53 | 51.61 | 20.61 | 48.54 | 257.00 | 33.965 | 59 | 4.271659 |
| 3240 | 54 | 51.36 | 20.80 | 48.76 | 257.00 | 33.965 | 57 | 4.290749 |
| 3300 | 55 | 51.17 | 21.04 | 48.61 | 257.00 | 33.965 | 50 | 4.309838 |
| 3360 | 56 | 50.92 | 21.04 | 48.24 | 257.00 | 33.965 | 43 | 4.328928 |
| 3420 | 57 | 51.02 | 20.46 | 47.79 | 257.00 | 33.965 | 45 | 4.348018 |
| 3480 | 58 | 50.68 | 20.56 | 47.87 | 257.00 | 33.965 | 40 | 4.367107 |
| 3540 | 59 | 50.72 | 20.46 | 47.72 | 257.00 | 33.965 | 40 | 4.386197 |
| 3600 | 60 | 50.38 | 20.31 | 47.34 | 257.00 | 33.965 | 33 | 4.405286 |
| 3660 | 61 | 50.04 | 20.12 | 47.04 | 257.00 | 33.965 | 32 | |
| 3720 | 62 | 49.94 | 20.26 | 47.12 | 257.00 | 33.965 | 32 | |
| 3780 | 63 | 50.04 | 20.31 | 47.27 | 257.00 | 33.965 | 35 | |
| 3840 | 64 | 49.64 | 20.12 | 46.82 | 257.00 | 33.965 | 28 | |
| 3900 | 65 | 49.30 | 20.31 | 46.89 | 257.00 | 33.965 | 27 | |
| 3960 | 66 | 49.40 | 20.36 | 47.04 | 257.00 | 33.965 | 31 | |
| 4020 | 67 | 49.79 | 20.41 | 47.34 | 234.00 | 30.925 | 3 | |
| 4080 | 68 | 50.23 | 20.36 | 47.42 | 234.00 | 30.925 | 5 | |
| 4140 | 69 | 50.63 | 20.56 | 47.57 | 234.00 | 30.925 | 4 | |
| 4200 | 70 | 50.72 | 20.70 | 44.65 | 234.00 | 30.925 | −37 | |
| 4260 | 71 | 50.92 | 20.65 | 47.72 | 234.00 | 30.925 | 3 | |
| 4320 | 72 | 50.92 | 20.85 | 48.01 | 234.00 | 30.925 | 3 | |
| 4380 | 73 | 51.27 | 20.75 | 48.16 | 234.00 | 30.925 | 9 | |
| 4440 | 74 | 51.27 | 20.41 | 48.39 | 247.00 | 32.643 | 33 | |
| 4500 | 75 | 50.92 | 20.85 | 48.01 | 247.00 | 32.643 | 20 | |
| 4560 | 76 | 50.92 | 20.51 | 48.01 | 247.00 | 32.643 | 27 | |
| 4620 | 77 | 51.02 | 20.75 | 47.72 | 247.00 | 32.643 | 20 | |
| 4680 | 78 | 50.82 | 20.80 | 48.01 | 247.00 | 32.643 | 22 | |
| 4740 | 79 | 50.97 | 20.61 | 47.87 | 247.00 | 32.643 | 25 | |
| 4800 | 80 | 50.77 | 20.80 | 47.79 | 247.00 | 32.643 | 19 | |
| 4860 | 81 | 50.53 | 20.46 | 47.79 | 247.00 | 32.643 | 23 | |
| 4920 | 82 | 50.38 | 20.80 | 47.87 | 247.00 | 32.643 | 20 | |
| 4980 | 83 | 50.53 | 21.00 | 47.49 | 247.00 | 32.643 | 14 | |
| 5040 | 84 | 50.33 | 20.70 | 47.57 | 247.00 | 32.643 | 17 | |
| 5100 | 85 | 50.33 | 21.04 | 47.42 | 247.00 | 32.643 | 12 | |
| 5160 | 86 | 50.68 | 20.61 | 48.01 | 247.00 | 32.643 | 28 | |
| 5220 | 87 | 50.33 | 20.61 | 47.94 | 247.00 | 32.643 | 23 | |
| 5280 | 88 | 50.38 | 20.80 | 47.64 | 247.00 | 32.643 | 18 | |
| 5340 | 89 | 50.53 | 20.90 | 47.94 | 247.00 | 32.643 | 22 | |
| 5400 | 90 | 50.48 | 20.90 | 48.16 | 247.00 | 32.643 | 23 | |
| 5460 | 91 | 50.48 | 20.90 | 48.16 | 247.00 | 32.643 | 24 | |
| 5520 | 92 | 50.48 | 20.90 | 48.16 | 247.00 | 32.643 | 24 | |
| 5580 | 93 | 50.48 | 20.90 | 48.16 | 247.00 | 32.643 | 24 | |
| 5640 | 94 | 50.48 | 20.90 | 48.16 | 247.00 | 32.643 | 24 | |
| 5700 | 95 | 50.48 | 20.90 | 48.16 | 247.00 | 32.643 | 24 | |
| 5760 | 96 | 50.48 | 20.90 | 48.16 | 247.00 | 32.643 | 24 | |
| 5820 | 97 | 50.48 | 20.90 | 48.16 | 247.00 | 32.643 | 24 | |
| 5880 | 98 | 50.48 | 20.90 | 48.16 | 247.00 | 32.643 | 24 | |
| 5940 | 99 | 50.48 | 20.90 | 48.16 | 247.00 | 32.643 | 24 | |
| 6000 | 100 | 50.48 | 20.90 | 48.16 | 247.00 | 32.643 | 24 | |
| 6060 | 101 | 50.48 | 20.90 | 48.16 | 247.00 | 32.643 | 24 | |
| 6120 | 102 | 50.48 | 20.90 | 48.16 | 247.00 | 32.643 | 24 | |
| 6180 | 103 | 50.48 | 20.90 | 48.16 | 247.00 | 32.643 | 24 | |
| 6240 | 104 | 50.48 | 20.90 | 48.16 | 247.00 | 32.643 | 24 | |
| 6300 | 105 | 50.48 | 20.90 | 48.16 | 247.00 | 32.643 | 24 | |
| 6360 | 106 | 50.48 | 20.90 | 48.16 | 247.00 | 32.643 | 24 | |
| 6420 | 107 | 50.48 | 20.90 | 48.16 | 247.00 | 32.643 | 24 | |
| 6480 | 108 | 50.48 | 20.90 | 48.16 | 247.00 | 32.643 | 24 | |
| 6540 | 109 | 50.48 | 20.90 | 48.16 | 247.00 | 32.643 | 24 | |
| 6600 | 110 | 50.48 | 20.90 | 48.16 | 247.00 | 32.643 | 24 | |
| 6660 | 111 | 50.48 | 20.90 | 48.16 | 247.00 | 32.643 | 24 | |

TABLE 3-continued

Temperature and Exotherm Data for the Reaction Between Resorcinol and Formaldehyde
Under Cooling Conditions with the Programmed-Addition of Formaldehyde

| Data Pt sec | Time min | Batch Temperature deg C. | Inlet Temperature deg C. | Outlet Temperature deg C. | Coil Flow Rate grams/min | Avg Coil Flow Rate lb/hr | Rxn Heating BTU/lb-hr | Accumulated Batch Lbs |
|---|---|---|---|---|---|---|---|---|
| 6720 | 112 | 50.48 | 20.90 | 48.16 | 247.00 | 32.643 | 24 | |
| 6780 | 113 | 50.48 | 20.90 | 48.16 | 247.00 | 32.643 | 24 | |
| 6840 | 114 | 50.48 | 20.90 | 48.16 | 247.00 | 32.643 | 24 | |
| 6900 | 115 | 50.48 | 20.90 | 48.16 | 247.00 | 32.643 | 24 | |
| 6960 | 116 | 50.48 | 20.90 | 48.16 | 247.00 | 32.643 | 24 | |
| 7020 | 117 | 50.48 | 20.90 | 48.16 | 247.00 | 32.643 | 24 | |
| 7080 | 118 | 50.48 | 20.90 | 48.16 | 247.00 | 32.643 | 24 | |
| 7140 | 119 | 50.48 | 20.90 | 48.16 | 247.00 | 32.643 | 24 | |
| 7200 | 120 | 50.48 | 20.90 | 48.16 | 247.00 | 32.643 | 24 | |
| 7260 | 121 | 50.48 | 20.90 | 48.16 | 247.00 | 32.643 | 24 | |
| 7320 | 122 | 50.48 | 20.90 | 48.16 | 247.00 | 32.643 | 24 | |
| 7380 | 123 | 50.48 | 20.90 | 48.16 | 247.00 | 32.643 | 24 | |
| 7440 | 124 | 50.48 | 20.90 | 48.16 | 247.00 | 32.643 | 24 | |
| 7500 | 125 | 50.48 | 20.90 | 48.16 | 247.00 | 32.643 | 24 | |
| 7560 | 126 | 50.48 | 20.90 | 48.16 | 247.00 | 32.643 | 24 | |
| 7620 | 127 | 50.48 | 20.90 | 48.16 | 247.00 | 32.643 | 24 | |
| 7680 | 128 | 50.48 | 20.90 | 48.16 | 247.00 | 32.643 | 24 | |

Figure 3:
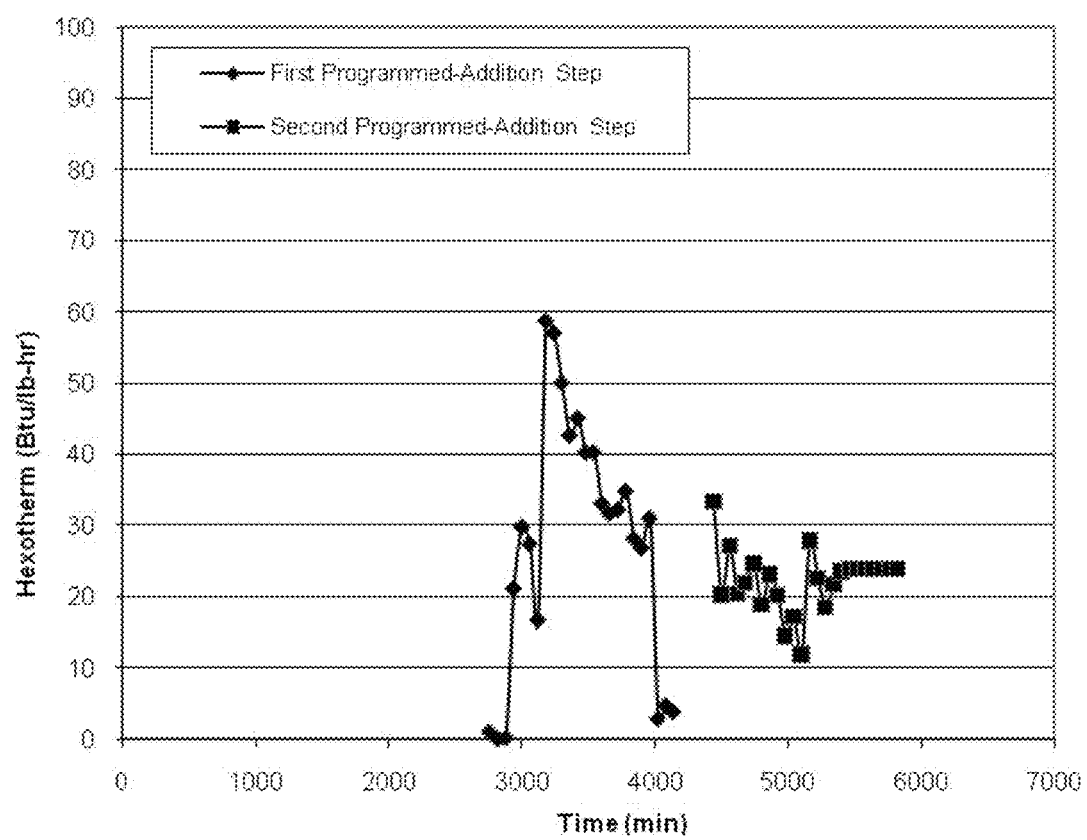
FIG. 3 is a graph demonstrating the exotherm (BTU/lb-hr) of a reaction between resorcinol and formaldehyde in the presence of a catalyst, with cooling, using a programmed-addition of formaldehyde.

By maintaining the temperature of the reaction at 50° C. and adding formaldehyde by a programmed-addition method, the exotherm value was observed in the range of 5 to 30 BTU/lb-hr. FIG. 3 illustrates the results of this experiment. This range is much lower than the reaction that was allowed to run either without cooling and without the programmed-addition of formaldehyde (Example 1) or with cooling but without the programmed-addition of formaldehyde (Example 2).

Thus, those three examples demonstrate that the process of controlling the exotherm of the reaction between resorcinol and formaldehyde by programmed-addition of formaldehyde could be useful for large production of precursor solutions on an industrial scale.

The exotherm value for the uncontrolled reaction was observed in the range of 18 to 540 BTU/lb-hr. By maintaining the temperature of reaction at 50° C., the exotherm value was observed in the range of 14 to 64 BTU/lb-hr. Whereas, keeping the temperature of the reaction at 50° C. and adding formaldehyde by programmed-addition, the exotherm value was observed in the range of 5 to 30 BTU/lb-hr.

Also, it was observed that stopping at a specific defined refractive index helps to make the reaction consistent in terms of molecular weight and branching. According to an embodiment of this invention, the range of 1.4000 to 1.4300 for refractive indices has been identified to stop the reaction in order to obtain a consistent product.

What is claimed is:

1. A process for making a precursor solution, comprising:
adding a cross-linking agent to a first mixture comprising water and a resorcinol compound to produce a second mixture comprising the cross-linking agent, water, and resorcinol compound;
reacting the resorcinol compound and the cross-linking agent in the presence of the water to produce the precursor solution, wherein the resorcinol compound and the cross-linking agent are reacted at a reaction temperature of 30° C. to 99° C.

2. The process of claim 1, wherein the reaction temperature of the resorcinol compound and the cross-linking agent is 40° C. to 99° C.

3. The process of claim 2, further comprising:
cooling the precursor solution to a temperature of less than 40° C. to produce a cooled precursor solution; and
heating the cooled precursor solution to a temperature of 60° C. to 99° C. for 12 hours to 96 hours to produce a sol-gel.

4. The process of claim 1, wherein the reaction temperature of the resorcinol compound and the cross-linking agent is 45° C. to 55° C.

5. The process of claim 1, wherein the second mixture has a molar ratio of the resorcinol compound to the cross-linking agent of 1:1 to 1:2.

6. The process of claim 1, wherein the resorcinol compound is represented by formula (I):

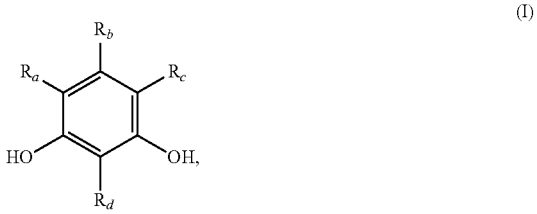

(I)

wherein each $R_a$, $R_b$, $R_c$, and $R_d$ is independently selected from the group consisting of: hydrogen; hydroxy; a halide; nitro; benzo; carboxy; acyl; alkyl; alkenyl; unsubstituted or substituted methacrylate; unsubstituted or substituted acrylate; silyl ether; siloxanyl; aryl; aralkyl; and alkaryl; and
wherein at least two of $R_a$, $R_c$, and $R_d$ are hydrogen.

7. The process of claim 1, wherein the cross-linking agent comprises formaldehyde, paraformaldehyde, a trioxane, acetaldehyde, propionaldehyde, butyraldehyde, crotonaldehyde, cinnamaldehyde, benzaldehyde, furfural, acetone, methyl ethyl ketone, or a mixture thereof.

8. The process of claim 1, wherein the first mixture further comprises a catalyst.

9. The process of claim 8, wherein the catalyst comprises, hydrochloric acid, sulfuric acid, phosphoric acid, phosphorous acid, a sulfonic acid, acetic acid having a chemical formula of $CH_3CO_2H$, or a mixture thereof.

10. The process of claim 1, wherein the first mixture, the second mixture, or both the first mixture and the second mixture further comprise methanol, diethylene glycol, 1,2-propane diol, 1,4-butane diol, 1,5-hexane diol, or a mixture thereof.

11. The process of claim 1, wherein the reaction temperature of the resorcinol compound and the cross-linking agent is 40° C. to 99° C., the method further comprising:
cooling the precursor solution to a temperature of less than 40° C. to produce a cooled precursor solution;
sealing the cooled precursor solution in a container; and
heating the cooled precursor solution in the sealed container to a temperature of 60° C. to 99° C. for 12 hours to 96 hours to produce a sol-gel.

12. A process for making a precursor solution, comprising:
heating a first mixture comprising water and a resorcinol compound to a temperature of 30° C. to 99° C. to produce a heated mixture comprising the water and the resorcinol compound;
adding a cross-linking agent to the heated mixture to produce a second mixture comprising the water, the resorcinol compound, and the cross-linking agent;
reacting the resorcinol compound and the cross-linking agent in the presence of the water to produce a precursor solution, wherein the resorcinol compound and the cross-linking agent are reacted at a reaction temperature of 30° C. to 99° C.

13. The process of claim 12, wherein the reaction temperature of the resorcinol compound and the cross-linking agent is 40° C. to 80° C.

14. The process of claim 12, wherein the cross-linking agent is added to the heated mixture as a continuous feed.

15. The process of claim 12, wherein the cross-linking agent is added to the heated mixture as a plurality of batches.

16. The process of claim 12, wherein:
the reaction temperature of the resorcinol compound and the cross-linking agent is 40° C. to 99° C.,
the resorcinol compound comprises benzene-1,3-diol, phenol, or a mixture thereof, and
the cross-linking agent comprises formaldehyde.

17. The process of claim 16, wherein the second mixture has a molar ratio of the resorcinol compound to the cross-linking agent of 1:1 to 1:2.

18. The process of claim 17, further comprising
cooling the precursor solution to a temperature of less than 40° C. to produce a cooled precursor solution; and
heating the precursor solution to a temperature of 60° C. to 99° C. for 12 hours to 96 hours to produce a sol-gel.

19. The process of claim 18, wherein the sol-gel is a microporous sol-gel or a mesoporous sol-gel.

20. A process for making a carbon aerogel or a carbon xerogel, comprising:
heating a first mixture comprising water and a resorcinol compound to a temperature of 30° C. to 99° C. to produce a heated mixture, wherein the resorcinol compound comprises benzene-1,3-diol, phenol, or a mixture thereof;
adding formaldehyde to the heated mixture to produce a second mixture comprising the water, the resorcinol compound, and the formaldehyde, wherein the second mixture is maintained at a temperature of 30° C. to 99° C.;
reacting the resorcinol compound and the formaldehyde in the presence of the water to produce a precursor solution, wherein the resorcinol compound and the formaldehyde are reacted at a temperature of 40° C. to 99° C.;
cooling the precursor solution to a temperature of less than 40° C. to produce a cooled precursor solution;
heating the cooled precursor solution to a temperature of 60° C. to 99° C. for 12 hours to 96 hours to produce a sol-gel; and
subjecting the sol-gel to an additional treatment to produce a carbon aerogel or a carbon xerogel, wherein the additional treatment comprises grinding, freeze drying, cryogenic drying, supercritical drying, vacuum drying, evaporation drying, pyrolysis, or any combination thereof.

* * * * *